Aug. 18, 1964     R. A. DALE     3,144,786

ANTI-FRICTION TYPE MOUNTING MEANS FOR CONNECTING RODS

Filed March 21, 1962     2 Sheets-Sheet 1

INVENTOR
ROBERT A. DALE

BY
ATTORNEYS

Aug. 18, 1964 R. A. DALE 3,144,786
ANTI-FRICTION TYPE MOUNTING MEANS FOR CONNECTING RODS
Filed March 21, 1962 2 Sheets-Sheet 2

INVENTOR
ROBERT A. DALE
BY
ATTORNEYS

United States Patent Office 3,144,786
Patented Aug. 18, 1964

1

3,144,786
ANTI-FRICTION TYPE MOUNTING MEANS
FOR CONNECTING RODS
Robert A. Dale, 4432 Oakland Ave. S.,
Minneapolis 7, Minn.
Filed Mar. 21, 1962, Ser. No. 181,387
5 Claims. (Cl. 74—579)

This invention relates to improvements in anti-friction type mounting means for connecting rods.

The internal combustion engines commercially used today upon automotive vehicles have a very low clearance between the connecting rod side faces and the crank pin supporting arms. If used for racing purposes these clearances are generally widened in order to provide not only for more efficient lubrication of all parts, but to prevent heating of the oil due to very high friction encountered between the adjoining connecting rods and the connecting rods and web arms of the crank shaft. To obviate this, the present invention utilizes friction reducing projections on the crank pin connecting portion of the connecting rod, which laterally project a sufficient distance so that when contacted with the facing sides of the web arms of the crank portion of the crank shaft clearances will be provided so as to enable lubricant to more efficiently perform its function of lubricating all relative sliding surfaces without undue heating of the oil. This is particularly true in connection with V-type engines, since the invention comprehends the provision of the friction lessening projections on the outer sides of the two connecting rods connected to a crank pin and in the intermediate space between the facing sides of the two connecting rods.

A further object of this invention is the provision of improved means for reducing the friction connections of connecting rods upon the crank pin sides of an internal combustion engine crank shaft, in which the friction reducing means consists of ball bearings.

In the accompanying drawings, forming a part of this specification, and wherein similar reference characters designate corresponding parts throughout the several views.

2

Figure 1:
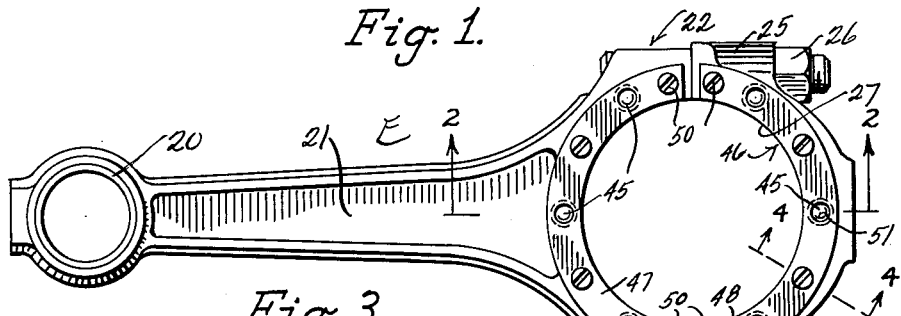
FIGURE 1 is a side elevation of a connecting rod provided with anti-friction type ball bearings mounted upon the sides of the crank pin connecting portion of the connecting rod so that small segmental portions thereof project outwardly beyond the outer sides for contact with the facing sides of the web arms at the crank pin areas.
Figure 2:
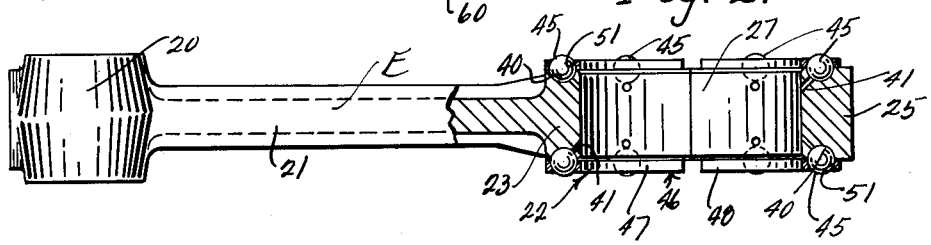
FIGURE 2 is a cross sectional view taken through the connecting rod of FIGURE 1 substantially on the line 2—2 of FIGURE 1.
Figure 6:
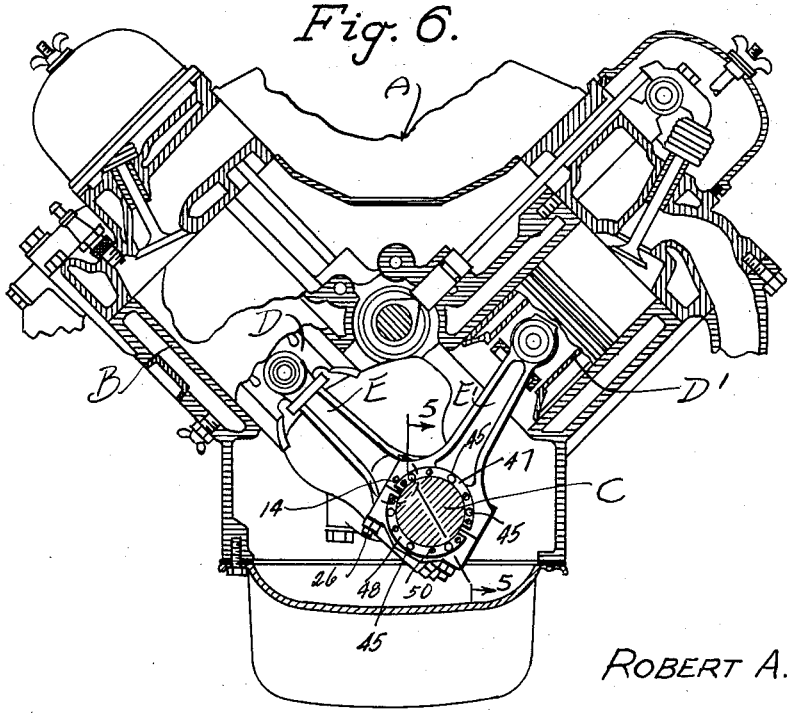

FIGURE 6 is a cross sectional view taken through a V-type engine showing its pistons and the relation of two of the connecting rods shown in FIGURES 1 and 2 attached to the crank pin of a crank shaft.

Figure 7:
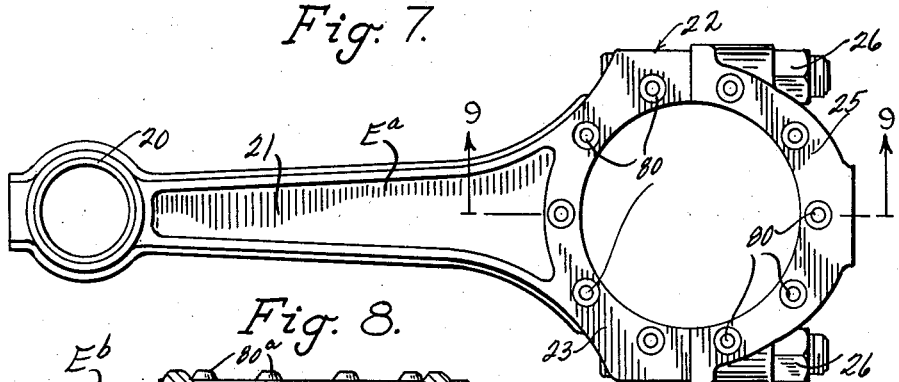

FIGURE 7 is a modified form of invention which, in counterdistinction to the form of connecting rod shown in FIGURE 1, is provided with nipple-type projections which are cast or formed integral with the crank pin connecting portions of the connecting rods.

Figure 3:
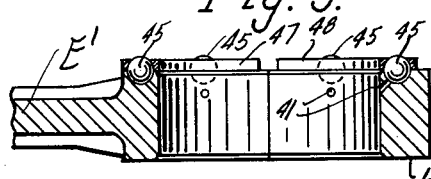
FIGURE 3 is a fragmentary cross sectional view of the crank pin connecting portion of a connecting rod constructed with anti-friction type ball bearing means mounted only on one side thereof and for use on V-type engines where two connecting rods are attached to a single crank pin of a crank shaft.
Figure 8:
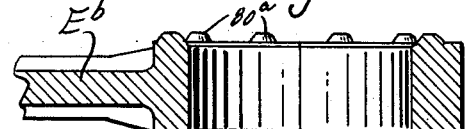

FIGURE 8 is a fragmentary cross sectional view of a connecting rod which corresponds to the form of invention shown in FIGURE 3 except that the anti-friction type projections are nipples cast upon the crank pin connecting portions of the connecting rods.

Figure 9:
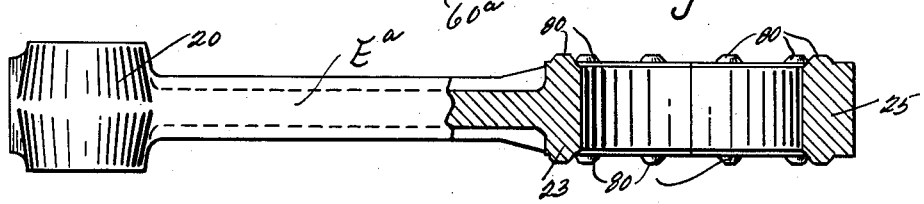

FIGURE 9 is a cross sectional view taken substantially on the line 9—9 of FIGURE 7, showing both sides of the crank pin connecting portion of the connecting rod as provided with laterally projecting nipples cast thereon.

In the drawings, wherein for the purpose of illustration are shown several embodiments of the invention, the letter A may generally designate an internal combustion of the V-type engine, including a casing B supporting a crank shaft C and having pistons D and D' operating in the cylinders thereof and connected to a crank pin of the crank shaft C by connecting rods E and E'.

For the purposes of this invention the crank shaft C includes the desired number of throw portions 10, each of which may consist of the web arms 11 and 12 and the integrally formed crank pin 13; the web arms 11 and 12 forming usually vertical side surfaces 11' and 12' which face each other and form the usual side bearing surfaces for receiving thrust from the crank pin connecting portions of the connecting rods. As above stated, it is usual to provide crank pin connecting portions on the connecting rods which have very slight side clearances with the surfaces 11' and 12'. If the engine is to be used upon vehicles adaptable for racing these clearances are widened to reduce friction and oil heating. The disadvantage in providing unusually wide clearances is that under such circumstances the engine can become noisy in operation and still cause extremely high oil temperature due to excessive friction from large contact areas of connecting rods. The crank shaft axis is designated at 14.

Each of the connecting rods E and E' includes the usual piston wrist pin connecting portion 20 at one end thereof; the arm body 21 and the crank pin connecting portion 22, which is divided and consists of a portion 23 integral with arm 21 arcuate in form and a semi-circular segment have a complementary arcuate portion 25 which may be bolted to the portion 22, as at 26, to define a circular opening 27 to receive the crank pin in usually snug-fitting but sliding relation thereon, using conventional type insert bearings.

If the engine is of the vertical type, each crank pin will probably have but a single connecting rod which will correspond to either the form of invention E shown in FIGURE 2 or the form of invention shown in FIGURE 9. In these forms of invention the friction reducing projections are provided on each of the outer lateral sides of the crank pin connecting portion 22.

Referring to the specific features of the anti-friction means supported by the crank shaft E, the same consists of providing semi-circular sockets 40 in each side wall of the portions 23 and 25 opening outwardly and having oil ducts 41 opening on the surface defining the central opening 27 of the crank pin connecting portion 22 of the crank shaft. These sockets 40 are provided at uniformly spaced distances annularly around each outer side surface of the crank pin connection portion 22.

Figure 4:
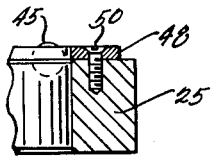
FIGURE 4 is a fragmentary cross sectional view taken substantially on the line 4—4 of FIGURE 1.
Figure 5:
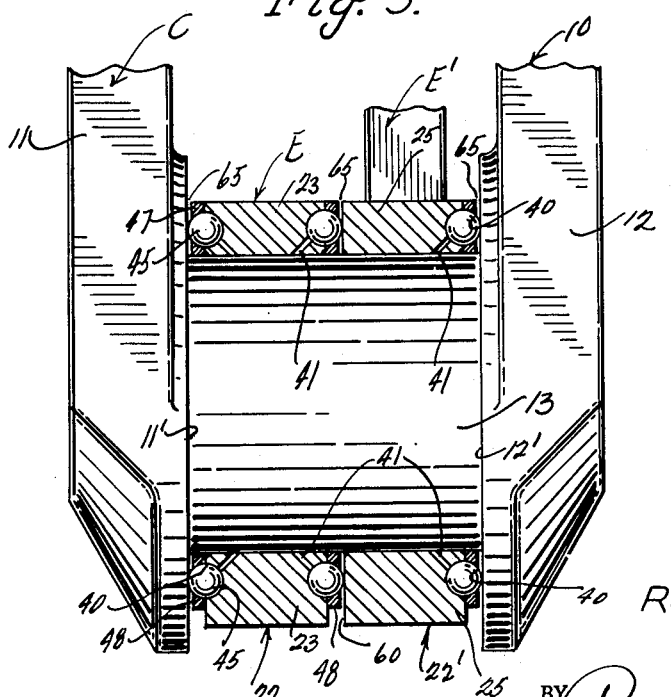
FIGURE 5 is a fragmentary cross sectional view of a throw portion of a crank shaft, showing the web arms and crank pin and with the improved connecting rod and anti-friction means of the arm shown in FIGURES 1 and 2 associated in an operating relation therewith.

The sockets 40 are adapted to receive ball bearings 45 therein which project appreciably beyond the two outer surfaces of the crank pin connecting portion 22, and the ball bearings 45 are retained in place by split rings located and attached to the crank pin connecting portion 22 at each side thereof. These split rings generally designated at 46 each consist of complementary arcuate segments 47 and 48 which are adapted to be respectively attached to the portions 23 and 25 of the crank pin connecting portion of the connecting rod by countersunk head bolts 50, as shown in FIGURE 4. The division of the complementary portions 47 and 48 lies at the division line of the crank pin connecting portions 23 and 25 as clearly designated in the drawings. These segments 47 and 48 lie at each side of the crank connecting portion of the connecting rods and are provided with openings 51 therethrough, concavely formed through the thickness of said portions 47 and 48 divergently from the inner side to the outer sides there and in conformity to the radius of the ball bearings, so that when the said ring portions 47 and 48 are attached in place a segmental portion of each ball bearing 40 will project beyond the outer surface of its ring portion, which in the case of racing engines, may be of from .005 to .020 of an inch. The segmental projectportions are well shown in FIGURE 2 at each side of the crank pin connecting portion of the connecting rod. In the case of a connecting rod E' which will be used side by side with one of the connecting rods E on a crank pin for an engine of the V-type, as shown in FIGURE 5 the arcuate portions of the crank pin attaching connecting portion 22' will have a side surface thereof designated at 60 in FIGURES 3 and 5 free of anti-friction reducing projections, since this surface 60 will ride against the projecting friction reducing bearings of the connecting rod E. The opposite side of the crank pin connecting portion 22' is provided with the anti-friction bearings and split retaining rings identical with those above described for the form of invention shown in FIGURE 2, and the same reference characters have been applied thereto.

The assembly of the connecting rods E and E' on the crank pin 13 and on the throw portion 10 of the connecting rod is shown in FIGURES 5 and 6 wherein clearance spaces 65 are provided between the crank pin connecting portions of the connecting rods and the faces 11' and 12' of the throw of the crank shaft and also between the facing surfaces of the crank pin connecting portions of the rods E and E'. Lubricant can very readily pass through these spaces and return to oil pan without getting heated to a higher temperature trying to lubricate a high friction contact area, and a lubricant can very readily pass through the ducts 41 into the sockets 40 for lubricating all contact surfaces of these bearings. Under these circumstances the lubricant will not overheat as readily nor will excessive friction be encountered between contacting sliding surfaces. As a matter of fact the provision of these friction reducing projections lessens the frictional contact area between the outer sides of the crank pin connecting portions of the connecting rods with each other and with the web arms of the throw portions of the crank arms by approximately 90%.

The oil ducts lubricate the ball bearing sockets and provide complete lubrication for the ball bearings for the purpose of eliminating wear of the sockets, and the oil under pressure will push the ball bearings against the crank pin shoulders of the web arms for the purpose of preventing lash.

Referring to the form of invention shown in FIGURES 7, 8 and 9, the connecting rods $E^a$ and $E^b$ correspond respectively to structural features above described for the rods E and E', with the exception of the friction reducing projections. And the same reference characters which have been applied thereto are the same as for the connecting rods E and E', with the exception of the friction reducing projections. In the form of connecting rod $E^a$ the crank pin connection portion 22 at each side thereof is provided with a series of nipples or projections 80 which may be cast integral with and on each side surface of the portions 23 and 25 and in uniformly spaced relation. For the form of invention $E^b$ the side surface $60^a$ is devoid of nipples or projections, since surface $60^a$ is intended to contact the nipples 80 of the connecting rod $E^a$ when placed upon the crank pin of a V-type engine, but on the opposite side the parts of the crank pin connecting portion 22 of the connecting rod $E^b$ is provided with nipples or projections $80^a$ similar to the nipples 80 of the rod $E^a$.

It will be apparent from the foregoing that in the form of invention shown in FIGURES 7, 8 and 9 the rods $E^a$ and $E^b$ are assembled on the crank pin in the same relative position as for the rods E and E' of the form of invention shown in FIGURE 5.

It will be readily apparent that the form of invention shown in FIGURES 7, 8 and 9 will be cheaper to produce than the form of invention shown in FIGURES 1, 2 and 3, although the latter will operate with greater efficiency, as is quite obvious.

Various changes in the size, shape and arrangement of parts may be made to the forms of invention herein shown and described without departing from the spirit of the invention or scope of the claims.

I claim:

1. As an article of manufacture, a crank shaft connecting rod comprising an elongated body having a wrist pin connecting means at one end and at the opposite end having a crank pin connecting portion, the outer sides of which are provided with small friction reducing projections integral therewith.

2. As an article of manufacture, a crank shaft connecting rod comprising an elongated body having a wrist pin connecting means at one end and at the opposite end having a crank pin connection provided at an outer side thereof with sockets, ball bearings rotatably mounted in said sockets, and a retaining ring secured to the side of said crank pin connecting portion holding said ball bearings in place and being provided with openings concavely converging outwardly and opening on the outer surface of the ring adapted to receive said ball bearings so that a small segmental portion of each ball bearing projects laterally beyond the outer side surface of said ring.

3. The connecting rod as described in claim 2 in which the crank pin connecting portion of the connecting rod is split to provide complementary portions with means connecting them whereby they may be attached about a crank pin, and in which the said ball bearing retaining ring is split along the same division line as the split of said crank pin connecting portion of the rod.

4. In combination with a crank shaft having a throw portion provided with web arms extending therefrom and a crank pin connected at the outer ends thereof, the side facing surfaces of said web arms beyond the outer surfacing of the crank pin being in substantially parallelism, a pair of connecting rods each including a crank pin connecting portion rotatably mounted on said crank pin so that said crank pin connecting portions of the two connecting rods can rotatably move independently of each other upon the crank pin, and small friction reducing projections mounted on said crank pin connecting portions of the connecting rods engaging at the outer sides of said crank pin connecting portions the facing parallel surfaces of the web arms to space the crank pin connecting portions of the connecting rod from said surfaces, and friction projections mounted on one of said crank pin connecting portions of one of the connecting rods projecting beyond the face thereof for contacting the facing side of the crank pin connection portion of the other connecting rod and spacing apart the facing surfaces of said crank pin connecting portions of said connecting rods.

5. The combination as defined in claim 4 in which said friction reducing projections consist of ball bearings rotatably mounted upon said crank pin connecting portions of the connecting rods and in which the crank pin connecting portions are each provided with ducts leading from said ball bearings to the inner crank pin mounting surfaces of said crank pin connecting portions.

References Cited in the file of this patent

UNITED STATES PATENTS

| | | |
|---|---|---|
| Re. 18,080 | Gotz | May 26, 1931 |
| 1,254,345 | Nowosielski | Jan. 22, 1918 |
| 1,935,546 | Dieter | Nov. 14, 1933 |
| 2,053,534 | Robinson | Sept. 8, 1936 |
| 2,145,864 | Denneen et al. | Feb. 7, 1939 |
| 2,265,065 | Daywalt et al. | Dec. 2, 1941 |
| 2,974,541 | Dolza | Mar. 14, 1961 |
| 3,033,031 | Gruber | July 27, 1962 |